March 5, 1957  L. E. SMITH  2,783,652
RECIPROCATING MOTION TRANSMITTING MECHANISM
Filed Jan. 19, 1956  2 Sheets-Sheet 1
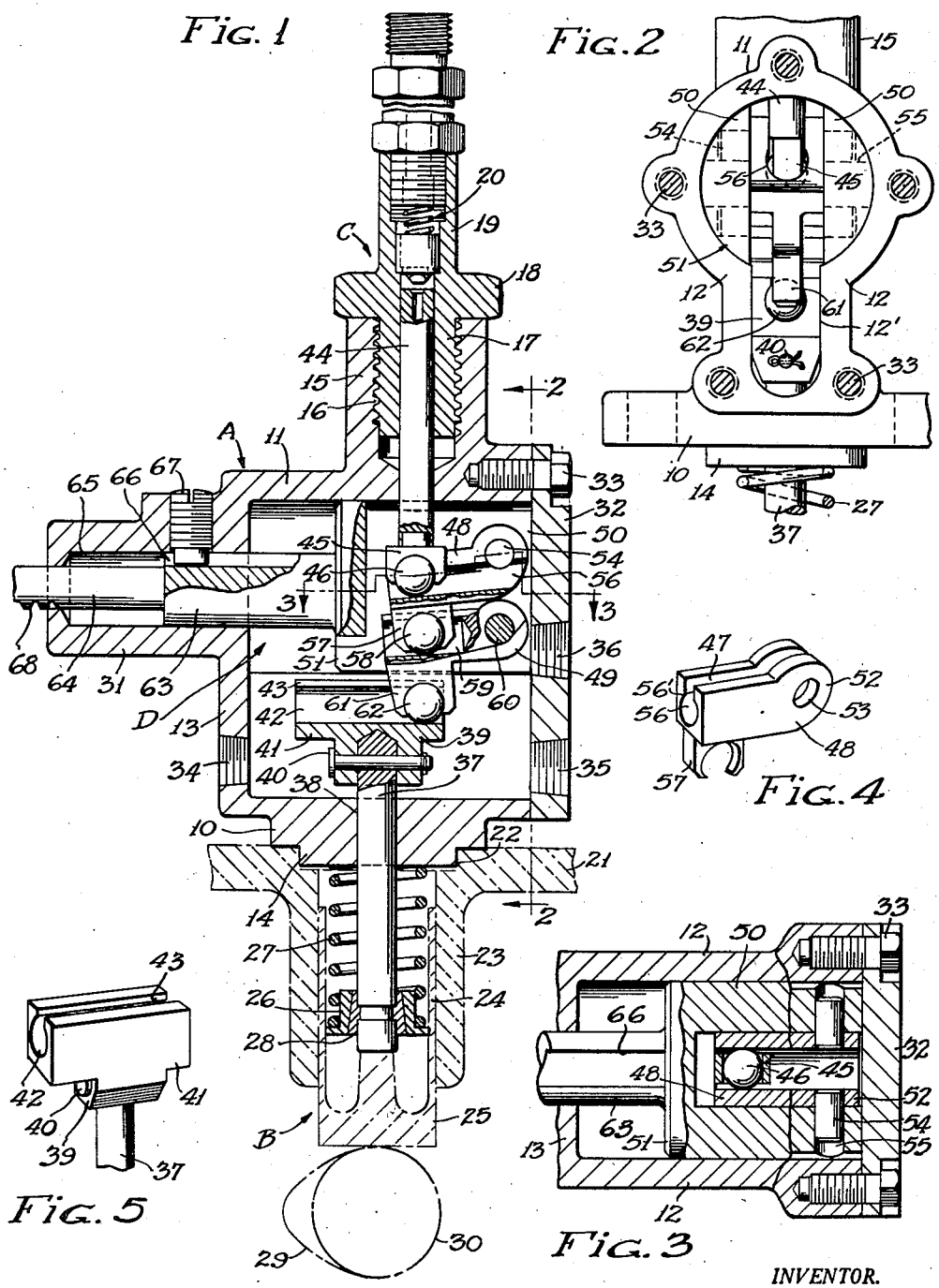
INVENTOR.
LUNDY E. SMITH
BY Lynn H. Latta
ATTORNEY March 5, 1957 L. E. SMITH 2,783,652
RECIPROCATING MOTION TRANSMITTING MECHANISM
Filed Jan. 19, 1956 2 Sheets-Sheet 2

INVENTOR.
LUNDY E. SMITH
BY
Lynn H Latta
-ATTORNEY-

United States Patent Office 2,783,652
Patented Mar. 5, 1957

2,783,652

RECIPROCATING MOTION TRANSMITTING MECHANISM

Lundy E. Smith, Barstow, Calif., assignor to George E. Smith, Pacoima, Calif.

Application January 19, 1956, Serial No. 560,122

13 Claims. (Cl. 74—110)

This invention relates to transmissions for transmitting reciprocating movement from a device of origin (e. g. cam, eccentric or crank) to an actuated mechanism of any kind requiring reciprocated movement. While the invention is useful in connection with pumps such as injector pumps for diesel engine mechanism, for changing valve strokes or piston strokes with the mechanisms in operation, it may be usefully applied to any mechanism wherein an accurately gauged reciprocating movement is required.

The general object of the invention is to provide for improved stroke adjustment in a reciprocating movement transmitting mechanism.

A particular object is to provide, in a reciprocating movement transmission, an improved mechanism for adjusting the stroke thereof without stopping the transmission of movement therethrough.

A further object is to provide a reciprocating movement transmission having stroke adjustment mechanism which minimizes the distortion of the ratio between input and output stroke amplitude as the stroke is varied between the limits provided for in the adjustment mechanism.

The invention deals particularly with a type of stroke adjustment mechanism which is interposed between reciprocating motion transmitting links one of which is a transmission link and the other of which is a receiving link, the two links being parallel and substantially in alignment, and a further object of the invention is to provide, in such an apparatus, adjusting mechanism including an adjusting actuator projecting laterally from the axis of transmission of reciprocating movement.

Other objects will become apparent in the ensuing specifications and appended drawing in which:

Fig. 1 is a longitudinal sectional view of a transmission apparatus embodying my invention;

Fig. 2 is a side view thereof with the housing cover removed and cap screws shown in section as indicated by the line 2—2 of Fig. 1;

Fig. 3 is a detail sectional view taken on the line 3—3 of Fig. 1;

Fig. 4 is a perspective view of one of the rocker arms;

Fig. 5 is a perspective view of the head of the transmitting stem;

Figure 8:
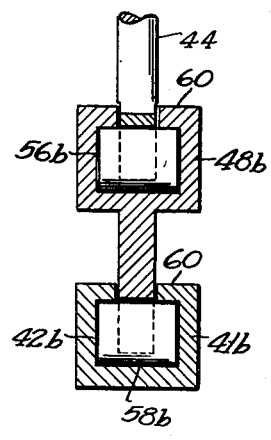
Fig. 8 is a transverse sectional view taken on the line 8—8 of Fig. 7.

Referring now to the drawings in detail, I have shown in Figs. 1–5, as an example of one form in which the invention may be embodied, a transmission which, in general, includes the following principal units: a housing unit A; a transmitting assembly B in one end of the said housing unit A; a receiving assembly C in the other end of the housing unit A; and an adjustment mechanism D interposed between transmitting and receiving assemblies B and C.

Housing A includes a central body section having respective end walls 10 and 11, side walls 12, and a back wall 13. Formed integrally with end walls 10 and 11 are bosses 14 and 15 respectively, the latter being elongated and internally threaded, at 16, to receive an externally threaded nipple section 17 of a bearing bushing fitting 18 which has, opposite section 17, a projecting gland sleeve 19 for reception and mounting of parts of an actuated mechanism such as an injector pump mechanism, herein indicated generally at 20 but forming no part of the present invention.

Merely by way of illustration of one application to which the invention may be usefully applied, I have shown, in phantom, a portion of a housing structure 21 having a counterbore 22 in which boss 14 is received with a piloting action, housing 21 having a tubular boss 23 functioning as a slide bearing for supporting and aligning the reciprocating parts of transmission assembly B including the cylindrical skirt 24 of a cam follower head 25, a flanged washer 26 being mounted within skirt 24 in compressive engagement with one end of a coil spring 27 the other end of which is seated against boss 14. Washer 26 is suitably connected, as by means of a split conical ring 28, to the grooved outer end of the push rod stem hereinafter described. Reciprocating movement may be developed by a cam 29 on a rotating cam shaft 30, or by any other means such as a crank and pitman, eccentric etc.

Formed integrally with back wall 13 of housing A is a slide bearing boss 31. The front of the housing body is open and is normally closed by a cover plate 32, attached to the housing body by cap screws 33. Wall 13 and cover plate 32 are shown as being provided with tapped apertures 34, 35 and 36 for reception of the threaded ends of pipe lines for conveying a fluid (such as varying grades of fuel oil) into the housing.

Transmission mechanism B comprises a push stem 37, slidably journalled in a bore 38 in end wall 10 of the housing, having at its outer end suitable means, such as the illustrated groove, for attaching the same to split ring 28, and having its inner end projecting into housing A.

Attached to the projecting inner end of stem 37 is a transmission yoke 39 which may be secured to stem 37 by a pin 40 and which has an elongated head 41, extending transversely to the axis of stem 37 and provide with a longitudinal bearing way 42 of cylindrical contour, which opens through a slot 43 at the side of head 41 opposite stem 37.

Yoke 39 has respective side faces that are machined in parallel planes, and side walls 12 of housing A are provided with machined interior faces 12' (Fig. 2) to which the side faces of yoke 39 are fitted with sufficiently close tolerance to prevent rotation of the yoke relative to the housing (thereby avoiding strains on an arm 49 hereinafter described) and yet with sufficient looseness to avoid noticeable resistance to adjustment of the unit D.

Receiving assembly C includes a piston rod 44 or other actuated rod or shaft slidably mounted in bushing unit 18 and having at its outer end any selected actuated mechanism such as the pump unit 20. The inner end of piston rod 44 is provided with a bearing retainer claw 45 in which is retained a bearing ball 46. Retainer claw 45 is of rectangular cross section in a plane normal to the axis of stem 44, as shown in Fig. 3, and fits snugly between the flat faces defining a slot 47 (Fig. 4) in a rocker arm 48. In the center of retainer claw 45 is a socket of segmental cylindrical cross section as indicated in Fig. 3, the retainer claw being of somewhat greater than 180° arcuate extent around the periphery of ball 46, so that the ball is retained in the claw against escape therefrom.

The adjusting mechanism D includes the rocker arm 48 and a second rocker arm 49, both embraced between the flat parallel fingers 50 of an adjustment slide 51. The fingers 50 are spaced to define a rectangular slot in which the rocker arms 48 and 49 are snugly embraced between fingers 50 so that they can swing only in a common plane parallel to the flat inner faces of fingers 50, the respective side faces of rocker arms 48 and 49 being likewise flat and parallel for bearing engagement against the flat inner faces of fingers 50.

Rocker arm 48 has at one end, spaced ears 52 provided with aligned cylindrical apertures 53 to receive the inner ends of trunnion pins 54 by means of which the rocker arm 48 is pivotally connected to slide yoke 51, fingers 50 of the latter having aligned cylindrical bores 55 in which the outer end of pins 54 are mounted.

Extending along the longitudinal axis of rocker arm 48 is a bearing way 56 of cylindrical form, having a diameter just slightly larger than that of ball 46 and receiving the latter so as to provide a combined pivotal and sliding connection between rocker arm 48 and the inner end of actuated stem 44. Retainer claw 45 extends into channel 56 and is snugly slidable in slot 47 which provides communication with way 56, with ball 46 engaged in claw 45, its respective sides projecting laterally therefrom beneath overhanging shoulders 56' defined at the intersection of way 56 by slot 47. The claw 45 is linked to rocker arm 48 for transmission of movement in both directions along the transmission axis.

Formed integrally with rocker arm 48 at its end opposite ears 52, and projecting laterally therefrom on the opposite side from slot 47, is a ball retainer claw 57 in which is retained a bearing ball 58. Claw 57 is approximately the same proportions as retainer claw 45, is received through a slot in arm 49 (corresponding generally to slot 47 of rocker arm 48), and projects into a cylindrical bearing way 59 in which bearing ball 58 is pivotally and slidably received. Ball 58 links claw 57 to arm 49 for two way movement transmission, the same as ball 46. Way 59 may extend only a part of the length of arm 49, the opposite end of the arm being solid and provided with a trunnion pin 60 the ends of which are journalled in slide yoke 51 in the same manner as trunnion pins 54. Opposite channel 59, arm 49 is provided with a retainer claw 61 in which is retained a bearing ball 62. The claw 61 projects through slot 43 of transmission head 41 and into way 42, in which ball 62 is pivotally and slidably received, to provide the same type of two-way movement transmitting link as balls 46 and 58.

Slide yoke 51 is formed on the end of a shaft 63 which is extended to provide an actuator stem 64 projecting slidably through the end of boss 31. Shaft 63 is slidably mounted in a bore 65 in boss 31 and is provided with a longitudinal groove 66 which receives the inner end of a set screw 67. Stem 64 may be provided with rack teeth 68 for meshing with an actuator pinion (not shown).

Push stem 37 and receiving stem 44 constitute transmission links either of which may be at either the transmitting or the receiving end of the transmission. That is to say, cam 29 and follower head 25 could be connected to stem 44, and pump unit 20 could be connected to stem 37, with the power flowing through the transmission in the opposite direction from that which occurs in the arrangement shown.

Operation

In the operation of the apparatus, reciprocating movement is transmitted from transmission head 41 to rocker arm 49 through ball 62, the latter rolling in way 42 with a slight movement transversely of the transmission axis as a resultant of the arcuate swinging of rocker arm 49 about the trunnions axis 60. Arm 49 in turn transmits the reciprocating movement through ball 58 to rocker arm 48, ball 58 rolling slightly in way 59 to accommodate the arcuate swinging movements of the rocker arms in unison. Rocker arm 48 transmits the reciprocating movement through ball 46 to receiving stem 44.

The amplitude of reciprocating movement transmitted to stem 44 from rocker arm 48, for any arcuate amplitude of swing of arm 48, depends upon the distance between bearing ball 46 and the axis of trunnions 54. Such distance is adjusted by shifting yoke 51 transversely of the transmission axis, using stem 64 to slide the yoke in housing A. In the position of adjustment shown in Fig. 1, the distance between the axis of trunnions 54 and ball 46 is at a maximum, the yoke 51 being at its rightward (as viewed in Fig. 1) limit of adjustment. At this position, ball 46 engages arm 48 near its free end and the ratio between stroke amplitudes of receiving stem 44 and transmission stem 37 respectively, is at a maximum, i. e., a substantially 1:1 ratio, the bearing balls 62, 58 and 46 being substantially in line. By sliding the yoke 51 leftwardly, the arms 48 and 49 are shifted in unison relative to ball 46 and transmission head 39, thus bringing the axis of trunnions 54 closer to (and at maximum leftward movement aligning with the center of) ball 46 while ball 62 is shifted leftwardly in way 42. The rocker arm 48 now has a shorter effective lever arm in transmitting its oscillating movement to ball 46, and consequently the amplitude of reciprocating movement received by stem 44 is reduced in relation to the amplitude of swing of arm 48, while the amplitude of movement transmitted to the arm 48 from transmission stem 37 remains substantially unchanged. Thus the transmission ratio of the apparatus is reduced from substantially 1:1 to a ratio substantially less than that value.

At the leftward limit of adjustment of yoke 51, the axis of trunnions 54 intersects the axis of stem 44, and reciprocating movement transmitted to arm 48 will cause it to swing without transmitting any movement to ball 46 (zero movement transmission) the center of the latter being at the axis of trunnions 54. In this limit position, ball 62 will bear against the leftward side of elongated head 41 of yoke 39.

Figure 6:
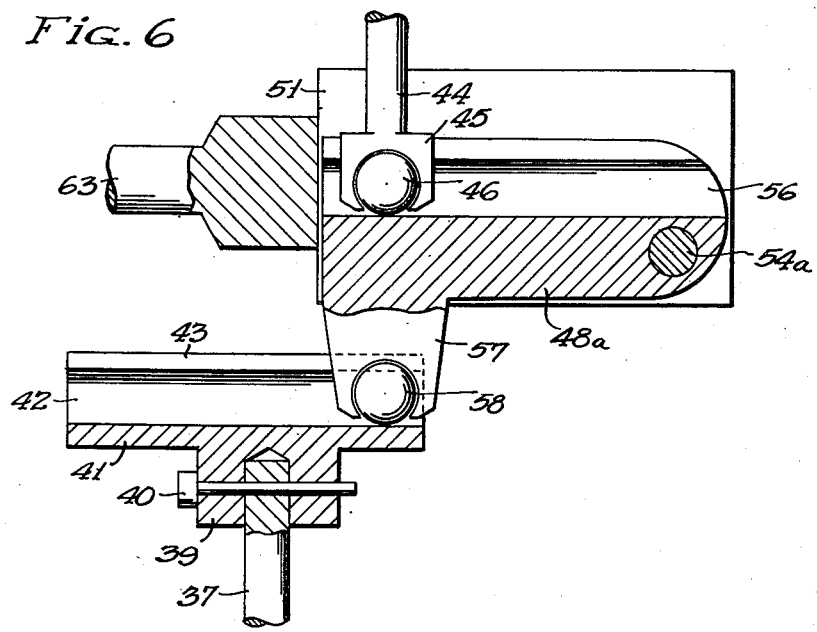
Fig. 6 is a sectional view of a transmission apparatus embodying a modified form of the invention.

Modified form—Fig. 6

As shown in Fig. 6, rocker arm 49 may be dispensed with and a rocker arm 48a, directly linked to stem 44 through ball 46, may also be directly linked to head 39 through its claw 57 and ball 58, claw 57 extending into way 42 through slot 43. Adjustment of yoke 51 will be accompanied by shifting of ball 58 in way 42.

Fig. 6 also discloses how a through trunnion pin 54a may be utilized instead of the separate trunnions 54 of Fig. 1, the pin 54a extending through the solid web of arm 48a below way.

Figure 7:
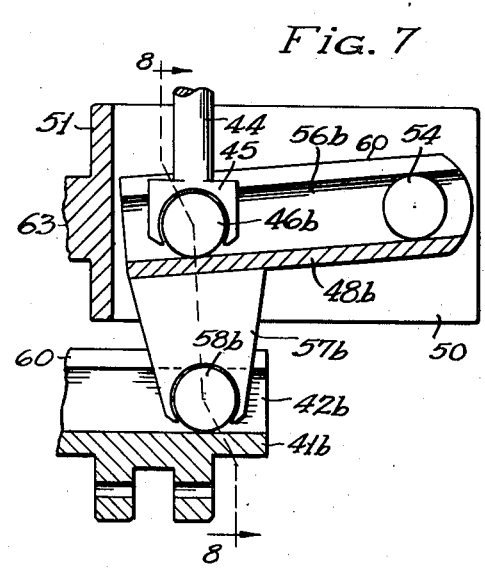
Fig. 7 is a sectional view of a transmission apparatus embodying another modification of the invention.

Modified form—Figs. 7 and 8

Figs. 7 and 8, the rolling link elements instead of balls 46, 58, etc., of Fig. 1, may consist in rollers, of either cylindrical or barrel form, cylindrical rollers 46b and 58b being shown in these figures. Where cylindrical rollers are employed, the ways 42b and 56b of head 41b and rocker arm 48b respectively are of rectangular channel section, as shown in Fig. 8, with flanges 60 which overhang the ends of the rollers 46b and 58b.

I claim:

1. Mechanism for transmitting reciprocating movement along a substantially linear transmission axis, comprising: transmission and receiving elements; means mounting said elements for reciprocating movements parallel to said axis with inner ends in opposed relation; a rolling bearing element carried by one of said inner ends; a transmission head having a bearing way transverse to said axis, attached to the other of said inner ends; adjustable transmission linkage interposed between said bearing element and transmission head for variable-ratio transmission of movement between said transmission elements, said linkage including rocker arm means having a rolling bearing element pivotally engaged in said bearing way, said rocker arm means having a bearing way disposed transversely of said axis, said first-mentioned rolling bearing element being pivotally engaged in said rocker arm bearing way, said bearing elements being adapted for relative longitudinal shifting movements in their respective ways, and being positively engaged therein for two-way transmission of movements along said transmission axis, and stroke adjusting means shiftable transversely of said axis and carrying said rocker arm means for arcuate swinging movements generally along said axis and for bodily shifting movements transversely of said axis, for varying the effective lever-arm length of said rocker arm means in the transmission of reciprocating movements between said rocker arm means and said first-mentioned rolling bearing element, whereby to vary the ratio of stroke amplitude as between said transmitting and receiving elements.

2. Mechanism as defined in claim 1, including bearing retainer claws embodied in said rocker arm means and in the inner end of said one transmission element respectively, and each having a segmental circular opening in which a respective rolling bearing element is retained for rotating movement, said bearing ways, each having along one side an open slot narrower than the cross-sectional diameter of the respective way, said claws each having a transverse thickness somewhat less than the width of a respective slot and projecting through said slot into its bearing way, and said rolling bearing elements projecting from both sides of their respective retainer claws and engaged in the respective ways to prevent separation therefrom along the transmission axis.

3. A transmission as defined in claim 2, wherein the rolling bearing elements are cylindrical and the respective ways are of rectangular channel section with reentrant flanges overhanging the roller ends to provide said positive two-way engagement.

4. A transmission as defined in claim 2, wherein the rolling bearing elements are spherical and said ways are cylindrical and of greater than 180° arcuate extent in cross-section.

5. Mechanism as defined in claim 1, wherein said rocker arm means includes a rocker arm having aligned trunnions projecting from opposite sides of one end thereof and journalled in said stroke-adjusting means, and having a bearing way extending from end to end thereof and past the axis of said trunnions, in which said first-mentioned rolling bearing element is engaged so as to provide for a position of adjustment wherein the center of said rolling bearing element will be in the same plane as said trunnion axis.

6. Transmission mechanism as defined in claim 1, wherein said rocker arm means comprises a pair of rocker arms having respective ways, retainer claws and rolling bearing elements, one of which is engaged in the way of the other rocker arm and the other of which is engaged in the way of said head.

7. Transmission mechanism as defined in claim 1, wherein said rocker arm means comprises a single rocker arm directly connected to said first mentioned bearing element and to said head respectively.

8. Mechanism as defined in claim 1, wherein said stroke-adjusting means comprises a yoke having opposed, spaced parallel fingers between which said rocker arm means is embraced and to which said rocker arm means is pivotally attached at one end for swinging movement in a plane of said transmission axis, and means carrying said yoke and slidingly supported for adjustment on an axis disposed in said plane and at substantially right angles to said transmission axis, and functioning to transmit adjusting movement to said yoke.

9. Mechanism for transmitting reciprocating movement along a substantially linear transmission axis, comprising: transmission and receiving elements; means mounting said elements for reciprocating movements parallel to said axis with inner ends in opposed relation; a bearing element carried by one of said inner ends; a transmission head having a bearing way transverse to said axis, attached to the other of said inner ends; adjustable transmission linkage interposed between said bearing element and transmission head for variable-ratio transmission of movement between said transmission elements, said linkage including rocker arm means having a bearing element pivotally engaged in said bearing way, said rocker arm means having a bearing way disposed transversely of said axis, said first mentioned bearing element being pivotally engaged in said rocker arm bearing way, said bearing elements being adapted for relative longitudinal shifting movements in their respective ways, and being positively engaged therein for two-way transmission of movements along said transmission axis, and stroke adjusting means shiftable transversely of said axis and carrying said rocker arm means for arcuate swinging movements generally along said axis and for bodily shifting movements transversely of said axis, for varying the effective lever-arm length of said rocker arm means in the transmission of reciprocating movements between said rocker arm means and said first-mentioned bearing element, whereby to vary the ratio of stroke amplitude as between said transmitting and receiving elements.

10. Mechanism for transmitting reciprocating movements along a substantially linear transmission axis, comprising: a housing; transmission and receiving stems mounted in opposite ends of said housing for axial sliding movements substantially along said axis, with their inner ends in opposed relation; a retainer claw on one of said inner ends, a rolling bearing element retained in said claw for free pivotal movements therein; rocker arm means interposed between said opposed inner ends and including a rocker arm having a bearing way extending longitudinally therein and transversely with reference to said transmission axis, in which said bearing element has a positive two-way engagement for pivotal movements and shifting movements longitudinally thereof, said arm having a side adjacent said one step provided with an open slot communicating with said bearing way and through which said claw projects into said way; stroke adjusting means including a yoke mounted in said housing for adjustment transversely of said transmission axis and means attached to said yoke and projecting through a side of said housing, for transmitting adjusting movements thereto, said rocker arm means being embraced within said yoke for free-swinging movements in a plane common to said transmission axis and the axis of adjusting movements of said stroke adjusting means, and said rocker arm means having at one end means pivotally connecting the same to said yoke for such free-swinging movements, and at its other end including a retainer claw projecting toward the other stem; a rolling bearing element retained in said last-mentioned claw; and a head on the inner end of said other stem having a bearing way extending transversely of said transmission axis in said common plane, and having, in its side remote from said other stem, an open slot extending along and communicating with said head bearing way, said rocker arm claw projecting through said head slot and into said head bearing way and its retained bearing element having a positive two-way engagement in said head bearing way for pivotal movements and for shifting longitudinally thereof, whereby said rocker arm means may be bodily shifted by said stroke-adjustment means to vary the effective lever-arm length of said rocker arm means in the transmission of reciprocating movements between said rocker arm means and said first mentioned rolling bearing element, whereby to vary the ratio of stroke amplitude as between said transmitting and receiving elements.

11. Mechanism as defined in claim 10, wherein said retainer claws are of flattened form, each having a thickness substantially less than the width of its retained bearing element, whereby each bearing element projects laterally from each side of its respective retaining claw, and wherein the respective slots are narrower than their respective bearing ways, and the respective bearing elements are retained in the respective claws and bearing ways to prevent separation therefrom along the transmission axis.

12. Mechanism as defined in claim 11, wherein said rocker arm means includes a second rocker arm having said second mentioned retainer claw as an integral part thereof and having a bearing way in its side opposite its said claw; and wherein said first mentioned rocker arm includes an integral retainer claw on its side opposite its bearing way, and including a third bearing element retained in said last mentioned claw and engaged in the bearing way of said second rocker arm.

13. Mechanism as defined in claim 12, wherein said second mentioned rocker arm includes trunnion means pivotally attaching the same to said yoke adjacent the axis of swinging movement of the first mentioned rocker arm, whereby said rocker arms may swing in unison and in parallel relation to one another.

References Cited in the file of this patent

UNITED STATES PATENTS 2,640,425    Saalfrank _____ June 2, 1953